United States Patent Office 3,702,365
Patented Nov. 7, 1972

3,702,365
4-ACETOACETYL AMINO-DIPHENYLAMINE IN COMPOSITIONS AND METHODS FOR TREATING PAIN, FEVER AND INFLAMMATION
Kurt Thiele, Barcelona, Spain, assignors to Deutsche Gold- und Silber-Scheideanstalt vormals Roessler, Frankfurt am Main, Germany
No Drawing. Filed June 17, 1971, Ser. No. 154,202
Int. Cl. A61k 27/00
U.S. Cl. 424—324                                                    15 Claims

ABSTRACT OF THE DISCLOSURE 4-acetoacetylamino-diphenylamine is useful in pharmacological preparations to reduce fever. It also has antiphlogistic and analgesic activity while at the same time showing very low toxicity.

---

4-acetoacetylamino-diphenylamine is known as an intermediate product for the product of dyestuffs, see U.S. Pat. 2,115,413.

It has now been found that 4-acetoacetylamino-diphenylamine and its nontoxic pharmacologically acceptable salts have valuable therapeutic properties and can be used as medicines. Examples of suitable salts are salts with acids such as hydrochloric acid, hydrobromic acid, succinic acid, maleic acid, fumaric acid, lactic acid, p-toluene sulfonic acid, sulfuric acid, malonic acid, citric acid, acetic acid, etc. The compounds in particular possess strong antiphlogistic, analgesic and antipyretic activity at very low toxicity.

For example, the compounds have a strong analgesic activity in mice in oral dosages of 1 to 500 mg./kg. body weight as shown in the mouse tail test of Haffner (Deutsche Medizinische Wochenshrift 55, 731, 1929).

The antiphlogistic activity is shown, for example, in the inflammation models of the rat's paw (Method of Domenjos and coworkers, Arch. exp. Pharm. Path. 230, 325, 1957). Thus the compounds of the invention have a strong inflammation reducing activity on the albumen edema of the rat's paw at oral dosages of 1 to 500 mg./kg.

4-acetoacetylamino-diphenylamine and its therapeutically valuable salts can therefore be used as pain alleviating, inflammation checking and fever reducing medicines. They are indicated, for example, for pains of any origin as well as chronic polyarthritis, sickness of the rheumatic group, post traumatic inflammations, swellings in fractures, thrombophlebitis in any form (as well as post operative), bursitis, synovitis, collagenoses (polymyositis, periarteriitis), gout, intraperitoneal adhesions.

The 4 - acetoacetylamino - diphenylamine can be used alone or in admixture with other medicines, in a given case with addition of further pharmaceutical carriers. It can be administered internally, orally, perlingually or parenterally in the form of tablets, capsules, pills, dragées, suppositories, oily or aqueous solutions or suspensions, injectable aqueous or oily solutions or suspensions or aerosols, as a spray, etc.

The therapeutic activity is explained, for example, in the following table in which 4-acetoacetylamino-diphenylamine is compared with the known antiphlogistic, phenylbutazone, as well as the known analgesic, phenacetin.

METHODS EMPLOYED

Antiphlogistic activity

The antiphlogistic activity was determined on the albumen edema of the rat paw at an oral dosage of 300 mg./kg. per rat according to the method of Domenjos et al. set forth above. The antiphlogistic activity is given as the edema checking in percent compared to the untreated control group.

Analgesic activity

The analgesic activity was determined in the mouse tail test of Haffner using oral application according to the method of Haffner set forth above. The dosage in mg./kg. body weight was determined at which there was produced in 50% of the tested animals a definite analgesic activity ($ED_{50}$). The substances were fed orally.

In the Haffner test the pain irritant was caused by setting up an arterial clamp on the tail root of the animal whereupon untreated mice showed the pain reaction (=biting in the arterial clamp). Various analgesics make it possible to suppress the pain reaction.

Fever reducing activity

The fever reducing activity was determined on the yeast fever of rats according to the method of O. Buch (Arch internat. Pharmacodyn. 123, 140, 1959). The dosage in mg./kg. of body weight was ascertained at which there was produced in 50% of the test animal a definite fever reducing activity ($ED_{50}$). The substances were applied orally.

The Buch procedure is to produce the experimental fever by intramuscular injection of a 15% yeast suspension in 1.5% tragacanth in physiological salt solution. The test substance is dispensed orally 16 hours after the onset of fever. Substantially the body temperature of the animals was measured at intervals of 30 minutes with a thermoprobe. Besides the body temperatures of the rat groups (5 animals per dosage) treated at different dosages there was also checked the body temperatures of a group which had only received the yeast suspension (fever controls) and a second group which had no preliminary treatment and showed the normal temperature of the rats (normal controls). The temperature difference between the fever and the normal controls, as an average value formed over the entire time of the experiment, amounted in the present experiments to an average of 2° C. and gives the height of the fever. The fever depression caused by the dosage of the substance is recorded as the difference between the fever of 2° C.=100% and the fever of the individual dosage groups as fever checking in percent. Animals which showed a reduction in fever of 50% or more were positive values. The number of positive value rats in a test group expressed in percent gives the fever reducing activity. From the percent value of individual dosages the $ED_{50}$ in mg./kg. was recorded graphically in a probability network. The $ED_{50}$ (average effective dosage) is also the dosage at which 50% of the tested rats showed a definite reduction in fever.

Toxicity

The determination of oral toxicity on white mice was determined by the international mode of procedure of

|  | Antiphlogistic activity in percent | Analgesic activity $ED_{50}$ | Fever reducing activity $ED_{50}$ | Toxicity $LD_{50}$, mg./kg., oral | |
|---|---|---|---|---|---|
|  |  |  |  | Mouse | Rat |
| 4-acetoacetylamino diphenylamine | 80 | 198 | 34 | 3,250 | 1,080 |
| Phenylbutazone | 70 | (¹) | 33 | 625 | 530 |
| Phenacetin | ------ | 700 | ------ | 2,040 | ------ |

¹ No activity detectable.

Miller and Tainter (Proc. Soc. Exp. Biol. Med. 57, 261, 1944) during an observation time of 24 hours. The toxicity was recorded as LD$_{50}$ in mg./kg. The LD$_{50}$ is that dosage at which 50% of the tested animals are killed.

The production of 4-acetoacetylamino-diphenylamine can be prepared, for example, by reaction of p-aminodiphenylamine with acetoacetic ester (U.S. Pat. No. 2,115,-413, Example 9) or by reaction of the p-aminodiphenylamine with diketene. The formation of the salts can be carried out in conventional manner, e.g. dissolving the free base in aqueous hydrochloric acid and evaporating to dryness.

EXAMPLE I 4-acetoacetylamino diphenylamine

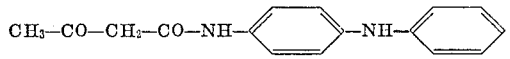

17 grams (0.2 mole) of diketene was added dropwise to a solution of 37 grams (0.2 mole) of 4-aminodiphenylamine in 130 ml. of dioxane with stirring at 20° C. After ending the dropping the mixture was heated to 50° C. for about 15 minutes. The solution was again cooled and treated with petroleum ether until it was almost turbid. After some time the reaction product crystallized out. It was sucked off and recrystallized from isopropanol, M.P. 97–98° C., yield 37 grams.

As pointed out above the compound of the invention is suited for the production of pharmaceutical compositions and preparations. The pharmaceutical compositions or medicines contain as the active material the compound of the invention, in a given case in admixture with other pharmacologically or pharamceutically active materials the production of the medicine can take place with use of known and customary pharmaceutical carriers and assistants.

The compositions of the invention of course should be sterile.

Suitable carriers and assistants are shown for example in Ulmann's "Encyklopadie der Technischen Chemie," vol. 4 (1953) pages 1 to 39; Journal of Pharmaceutical Sciences, vol. 52 (1963) pages 918 and following, H.v. Czetsch-Lindenwald, "Hilfstoffe für Pharmazie und angrenzende Gebiete," as well as in Pharm. Ind., vol. 2, 1961 page 72 and following. The entire disclosure of these publications are hereby incorporated by reference.

Examples of such carriers and assistants are gelatin, sucrose, pectin, starch, tylose, talcum, lycopodium, silica, lactose, cellulose derivatives, glucose, fructose, stearates, emulsifiers, plant oils, water, pharmaceutically compatible mono or polyvalent alcohols and polyethylene glycols such as ethyl alcohol, diethylene glycol, polyethylene glycol 400, ethylene glycol, propylene glycol, glycerine, serbitol, mannitol, pentaerythritol as well as derivatives of such alcohols, dimethyl sulfoxide, esters of aliphatic saturated or unsaturated fatty acids, e.g. stearic acid, palmitic acid or oleic acid with mono or polyvalent alcohols such as glycols, e.g. ethylene glycol, glycerine, diethylene glycol, pentaerythritol, sorbitol, mannitol, etc., which in a given case can be etherified, benzyl benzoate, dioxolane, glycerine formal, glycolfurole, dimethyl acetamide, lactamide, ethyl lactate, ethyl carbonate, etc.

It is also possible to add preservatives, buffers, taste correctives, antioxidants and complex formers (for example, ethylenediaminetetracetic acid) and the like.

As antioxidants there can be used, for example, sodium meta bisulfite and ascorbic acid, as preservatives, for example, sorbic acid, ethyl ester of p-hydroxybenzoic acid and similar materials.

Especially it is possible and frequently desirable to add other medicines for example spasm loosening material.

The pharmaceutical preparations generally contain 1 to 50% of the active component of the invention, but as stated above can contain 100% of the active material.

Dispensing as indicated above can be in the form of tablets, capsules, pills, dragees, plugs, salves, powders, liquids or aerosols. As liquids there can be used oily or aqueous solutions or suspensions. Preferred form of use are as tablets containing 50 to 200 mg. of active material or as solutions, e.g. aqueous solutions containing 0.5 to 2% of active materials.

The amount of the active component of the invention in the individual dosages, for example in dispensing orally is 50 mg., in dispensing intravenously 5 mg., always calculated on the free base. These dosages can be dispensed once or several times daily.

For example, 1 to 3 tablets containing 50 mg. of active material can be dispensed daily or, for example, a 1 ml. ampoule containing 10 mg. of active substance can be injected intravenously 1 to 3 times a day.

The compounds of the invention can be administered to mammals such as humans, dogs, cats, cattle, sheep, rats, mice, etc.

EXAMPLE II

Production of an injectable solution 10 grams of D 9245 (4-acetoacetylaminodiphenylamine) were dissolved in 1000 ml. of polyethylene glycol 400 with slight heating, the solution was diluted with water to 2000 ml. for injection, passed through a bacteria destroying filter and filled into 2 ml. glass ampoules in known manner.

The production of the injectable solution can take place under sterile precautions. It is also possible to work under normal conditions and then to heat sterilize the filled ampoules. Two ml. ampoule contains 10 mg. of D 9245.

EXAMPLE III

Production of an injectable solution 20.0 grams of D 9245 were dissolved in 1000 ml. of polyethylene glycol 400 with slight heating. In the same manner as in Example I there were filled 2 ml. ampoules with 100 mg. each of D 9245.

EXAMPLE IV

Production of an injectable solution 1.0 grams of D 9245 was dissolved with slight heating in a mixture of 600 ml. of 1,2-propylene glycol and 100 ml. of ethanol and made up to 1000 ml. with water. As in Example I there were produced 1 ml. ampoules containing 1 mg. of D 9245.

EXAMPLE V

Production of suppositories 50.0 grams of D 9245 was worked into 1950 grams of a melted suppository base (for example, Hartfett DAB7 which is a hard fat and is a mixture of primarily saturated higher fatty acid glycerides) and in known manner poured in forms to make 2.0 gram suppositories containing 50 mg. each of D 9245.

EXAMPLE VI

Production of tablets 10.0 grams of D 9245 were granulated in known manner with 10.0 grams of microcystalline cellulose and 124.5 grams of lactose with about 50 ml. of a 10% starch paste. The granules were dried and passed through a 1 mm. mesh sieve and mixed with 40.0 grams of corn starch, 20.0 grams of talc, 10.0 grams of microcrystalline cellulose and 0.5 gram of highly dispersed silica and in conventional manner pressed into tablets weighing 220 mg. and having a diameter of 9 mm.

Each tablet contained 10 mg. of D 9245.

EXAMPLE VII

Production of a solution for local application 10.0 grams of D 9245 were dissolved in 90 ml. of dimethyl sulfoxide and filled to 100 ml. with water. The 10% active solution was useful for local application, e.g. to the skin. The composition is useful for the treatment of inflammations.

EXAMPLE VIII

Production of Gelatin stick capsules 500.0 grams of D 9245 were granulated with about 250 ml. of ethanol (96% weight/vol.), after drying passed through a 0.5 mm. mesh sieve and filled into gelatin stick capsules size 00 in individual amounts of 250 mg. as single dosages 1 to 2 capsules, corresponding to 250–500 mg. of active material can be taken.

What is claimed is:

1. A nontoxic, pharmaceutical composition having antiphlogistic and analgesic activity comprising as the active ingredient an antiphlogistically and analgesically effective amount of 4-acetoacetylamino-diphenylamine or a pharmacologically acceptable salt thereof in a pharmaceutically acceptable carrier.

2. A composition according to claim 1 containing 1 to 50% of the active ingredient in a pharmaceutically acceptable carrier.

3. A composition according to claim 2 in tablet or pill form containing 50 to 200 mg. of active material.

4. A composition according to claim 2 wherein the active material is present in sterile solution in an amount of 0.5 to 2% of the total composition.

5. A composition according to claim 1 in the form of a solid pill, tablet or capsule.

6. A composition according to claim 1 in the form of a sterile injectable solution of the active ingredient in a nontoxic solvent.

7. A composition according to claim 6 wherein the solution is in an ampoule.

8. A composition according to claim 6 wherein the solvent includes a glycol.

9. A composition according to claim 1 also containing a sugar.

10. A process for treating a mammal comprising administering to said mammal internally an amount of the composition of claim 1 effective to reduce fever.

11. A process according to claim 9 wherein the composition is used in an amount sufficient to administer 1 to 500 mg. of active ingredient per kg. of body weight.

12. A process for treating a mammal comprising administering to said mammal internally the composition of claim 1 in an amount sufficient to provide antiphlogistic or analgesic activity.

13. A process according to claim 12 wherein the composition is used in an amount sufficient to administer 1 to 500 mg. of active ingredient per kg. of body weight.

14. A process according to claim 13 wherein the composition is administered orally.

15. A process according to claim 13 wherein the composition is administered by injection.

References Cited

UNITED STATES PATENTS 2,115,413  4/1938  Dahlen et al. _____ 260—562 K

STANLEY J. FRIEDMAN, Primary Examiner